United States Patent
Hamilton et al.

[11] 3,879,184
[45] Apr. 22, 1975

[54] PROCESS FOR TREATING A GLASS SHEET BENT TO A RELATIVELY SHARP ANGLE

[75] Inventors: Harold E. Hamilton, Toledo; Ivan L. Soreghy, Swanton, both of Ohio

[73] Assignee: Libbey-Owens-Ford Company, Toledo, Ohio

[22] Filed: Jan. 31, 1974

[21] Appl. No.: 438,234

[52] U.S. Cl. ............................. 65/107; 65/DIG. 4
[51] Int. Cl. ................................. C03b 23/02
[58] Field of Search .......... 65/106, 107, 40, DIG. 4

[56] References Cited
UNITED STATES PATENTS
3,762,904  10/1973  Hamilton et al. .................. 65/107

*Primary Examiner*—Arthur D. Kellogg
*Attorney, Agent, or Firm*—Collins, Oberlin & Darr

[57] ABSTRACT

A process for altering the residual stain remaining along the relatively sharp bend of a glass sheet resulting from the passage of an electric current through an electrically conducting path to effect the bend. The process includes interposing a strip of coloring agent between the glass sheet surface and the electrically conducting path lengthwise of the latter prior to electrically charging the same.

10 Claims, 6 Drawing Figures

PATENTED APR 22 1975  3,879,184

PROCESS FOR TREATING A GLASS SHEET BENT TO A RELATIVELY SHARP ANGLE

BACKGROUND OF THE INVENTION

Various glass bending techniques have been developed in recent years to accommodate the numerous glass configurations incorporated in the design of automobiles, such as the commonly referred to "cap" and "wrap-around" windshields and backlights. Sometimes it is desirable to shape or form the glass compatible with styling features found in the adjacent sheet metal panel in order to create the appearance of unity between the glass and the sheet metal. By way of example, it may be desirable to provide a generally vertically extending sharp bend in a windshield or backlight in continuation of a bead or molding strip on the surface of the hood, roof panel or deck lid. At times it may also be desirable to form a sharp bend in either a horizontal or vertical direction to effect wrap-around of the windshield or backlight into the roof line of the vehicle or the side surfaces thereof. The formation of such bends, i.e., V-shaped bends or bends having very small radii of curvatures, pose problems in fabrication.

The glass bending methods disclosed and claimed in U.S. Pat. Nos. 3,762,903 and 3,762,904, assigned to the same assignee as the present invention, provided a solution to these problems by utilizing an improved method for angularly bending one or more glass sheets at a relatively sharp angle without adversely affecting or distorting portions of the glass adjacent the bend. To this end, an electrically conducting path is formed on at least one surface of the glass sheet along a line about which it is desired to bend the sheet. Subsequently, an electrical potential is applied across such path of a sufficient magnitude and for a time adequate to heat the sheet in the area immediately adjacent said path to a temperature above the bending point of the glass, causing the glass sheet to bend along the line of the electrically conducting path to form the desired relatively sharp angle therein.

The electrically conducting path is formed by applying to at least one surface of the glass a conductive metallic paste, such as a silver paste material, along the line about which the bend is desired. While such a silver paste provides an efficient electrical conductive path to provide the necessary localized heating at the V-shaped bend, it adheres to the finished bent glass as an integral part thereof in the form of an elongated narrow stain or line having a yellow-brown appearance. This yellowish-brown stain is objectionable from the standpoint of design and aesthetics, often presenting a harsh contrast to the color or combination of colors employed on the automobile body, roof, etc., to detract from the general appearance thereof.

SUMMARY OF THE INVENTION

Accordingly, it is an object of the present invention to provide a method for altering the residual stain normally remaining along the relatively sharp angular bend in a glass sheet as a result of the charging of the electrical conductive metallic paste initially applied thereto for localized heating.

It is another object of this invention to interpose an undercoating of a coloring agent between the glass sheet surface and the foregoing electrical conductive paste material to alter the color of the residual stain resulting from the firing of the electrical conductive paste material.

It is a further object of the present invention to provide an undercoating for the foregoing electrical conductive paste material to preclude adherence of the latter to the glass interface.

In one aspect thereof, the method of the present invention is characterized by the interposition of an undercoating between a glass sheet surface and the electrically conductive metallic paste material applied thereto for localized heating to at least alter the appearance of the residual stain normally left on the finished glass product after firing.

Other objects and advantages of the invention will become more apparent during the course of the following description when taken in connection with the accompanying drawings.

BRIEF DESCRIPTION OF THE DRAWING

In the drawings wherein like numerals are employed to designate like parts throughout the same.

DETAILED DESCRIPTION OF AN ILLUSTRATIVE EMBODIMENT

Figure 1:
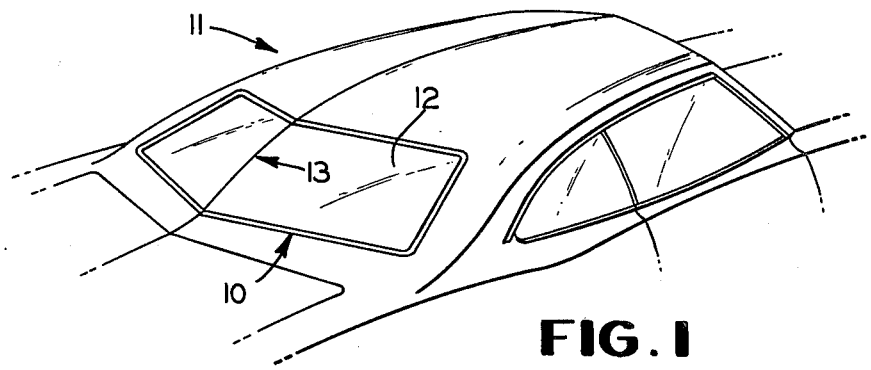
FIG. 1 is a perspective view of an automobile including a bent glass back window or backlight produced in accordance with the present invention.
Figure 2:
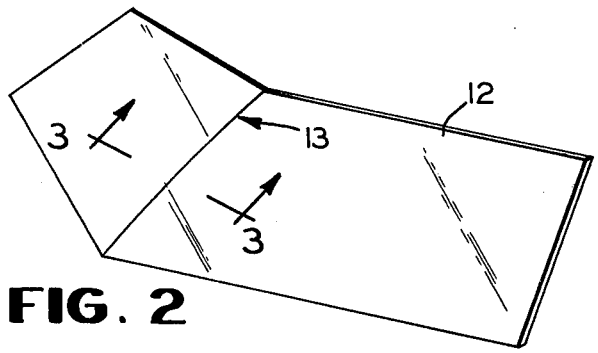
FIG. 2 is a perspective view of the backlight illustrated in FIG. 1.

Referring now in detail to the illustrative embodiment depicted in the accompanying drawing, there is shown in FIG. 1 a backlight 10 constructed in accordance with this invention as it appears from the outside of an automobile 11 in which the backlight is mounted. The backlight 10 is comprised of a single glass sheet 12 of V-shaped configuration, being bent along a straight line path indicated generally at 13 extending from one longitudinal edge of the glass sheet to the other, intermediate of and parallel to the transverse edges. The path or axis of the bend is defined by a fired electrically conducting frit line 14, hereinafter described in detail. While it will be convenient to describe the method of this invention in connection with the formation of the backlight 10, it should be understood that the principles of this invention are equally applicable in the production of multiple layered sheets of glass, such as in the conventional laminated construction of a windshield for example, which generally comprises two sheets of glass and a non-brittle thermoplastic interlayer, all bonded together to form an integral structure.

Figure 4:
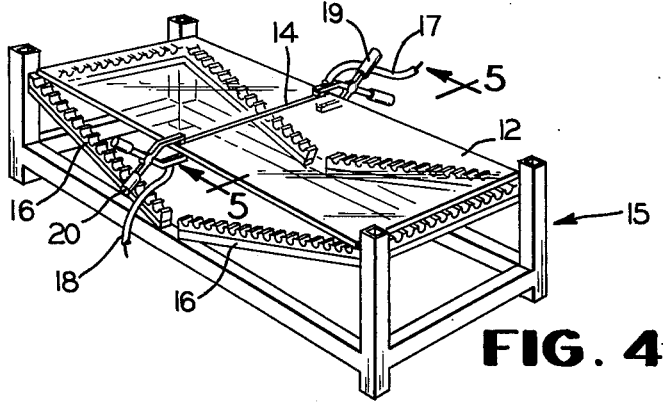
FIG. 4 is a perspective view showing a glass sheet in position on a mold prior to initiation of the bending process.
Figure 6:
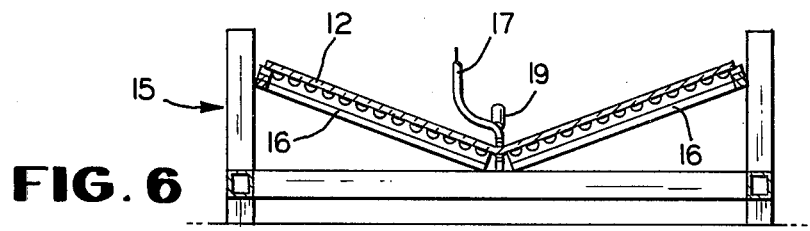
FIG. 6 is a sectional view showing the glass sheet supported on the mold upon the conclusion of the bending process.

The glass sheet 12 can be bent upon a ring or skeleton type mold indicated generally at 15 in FIGS. 4 and 6. Molds of this type are conventionally used for the bending of glass and have a peripheral rail 16, the top edge of which forms the shaping surface for forming the glass. In accordance with present-day practice, the rail 16 may be either a substantially single piece stationary member, as shown, or formed of articulated sections which are moved during the bending of the glass from an open glass receiving position to a closed, final position.

Prior to positioning the glass sheet on the bending mold 15, the electrically conducting frit line or resistance element 14 can be formed thereon in accordance with the method set forth in U.S. Pat. No. 3,762,903. If desired, a groove may be formed in one or both surfaces of the glass sheet 12 along the line of the subsequent bend to facilitate the bending operation as set forth in detail in U.S. Pat. No. 3,762,904, and the electrically conducting frit line 14 may then be formed in such groove. While various materials may be used to form these electrically conducting paths or resistance heating elements 14, preferred compositions are comprised of conductive metal pastes. These materials, sometimes also referred to as inks, are applied to the glass sheet by conventional silk screen processes, painting, or other conventional uniform coating methods and then are heated or fired to fuse the material to the sheet.

Typically, the pastes comprise conductive metal particles, e.g., silver, glass frit particles and organic binders and solvent. The glass frit, in addition to fusing the heating elements or strips to the sheet, also serves as an extender by which the desired conductivity or resistivity is achieved in the paths or elements 14. Thus, for a given cross sectional area of the elements, the silver, which imparts electrical conductivity thereto, can be diluted or extended with the glass frit to attain the desired resistance which in turn determines the heat developed in the paths and glass immediately adjacent thereto.

Although the conductive silver pastes are ideally suited for forming the electrically conducting paths, other conductive metal pastes may be used, e.g., those containing gold, palladium, platinum and alloys thereof. In addition, air drying dispersions of conductive metals may be employed. One particular material of this type which has been used successfully is "Dag 422," a dispersion of silver plus graphite in a water carrier obtained from the Acheson Colloids Co., Port Huron, Mich. Also, materials such as electrically conducting tapes which may or may not be removed after the bending step can be employed.

Figure 5:
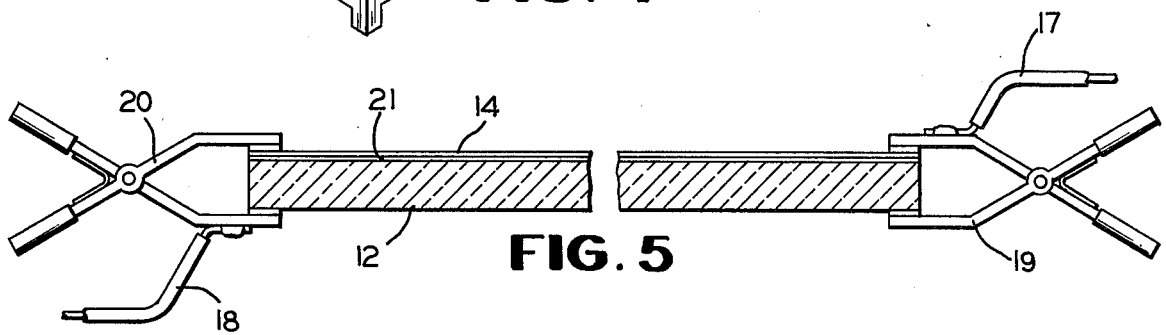
FIG. 5 is a sectional view taken along the line 5—5 of FIG. 4.

After the electrically conducting line or resistance element 14 has been satisfactorily laid down, the glass sheet 12 is positioned on the bending mold by supporting the transverse edges of the sheet on a shaping surface of the mold (FIG. 4). Leads 17 and 18 from a suitable electrical power source (not shown) are then placed in electrical contact with the line 14 through alligator clips or the like 19 and 20, respectively, (FIGS. 4 and 5).

Prior to supplying power to the leads 17 and 18, the bending mold and glass sheet carried thereby are preferably heated to a relatively high temperature, for example, above the strain point of the glass but below the bending point or the temperature at which the glass bends to any significant degree. In this respect, temperatures in the range from approximately 900° to 1,150° F. have been found satisfactory. The purpose of this preliminary heating, which may be accomplished by conveying the mold through a furnace, is to prevent the formation of permanent stresses in the glass, obviate the tendency of the glass to crack when subsequently heated locally along the electrically conducting line 14 to its bending temperature, and also to enable the accomplishment of this latter step within a time acceptable from a commercial standpoint and with the use of a reasonable amount of electrical energy.

Upon the glass sheet reaching the desired over-all temperature, power is supplied to the leads 17 and 18 and consequently to the resistance element 14. This in turn heats the glass sheet immediately adjacent resistance element 14 to a temperature above the bending temperature of the glass, for example, above approximately 1,200° F., at which time the sheet bends sharply along the path 13 and settles by gravity into the generally V-shaped configuration illustrated in FIG. 6. The sheet is then allowed to cool at room temperature.

As a result of the above described localized heating process effected by the application of power through the electrical conducting path, the silver paste material forming the latter adheres to the glass sheet and forms an objectionable yellow-brown stain thereon extending longitudinally of the bend. It is desirable that such stain be at least altered to obtain a color pattern less objectionable from the standpoint of aesthetics and more compatible with the color combinations of the automobile body so as to enhance the general appearance of the automobile.

It has been found that the application of a suitable coloring agent as an undercoating or substrate for the electrically conducting silver paste material serves to alter the residual silver stain sufficiently to yield a more compatible color with automobile body design requirements. To this end, and in accordance with this invention, prior to forming the electrically conducting path or resistance element 14 on the glass surface, a coloring agent is applied to at least one surface of the glass sheet 12 along a strip or band 21 (FIG. 3) upon which the electrical conducting path will be formed and about which it is desired to bend the sheet. While various materials, such as blue, red and green pigments and various shades thereof, may be used to form this undercoating, preferred compositions comprise pure black pigments and mixtures of pure black pigments and black enamels, i.e., black pigments containing a minor percentage of frit. These materials can be applied to the glass sheet surface by conventional silk screen processes, painting, or other known coating processes and then allowed to dry at room temperature.

A preferred specific coloring agent, which has yielded good results, is a fritless, pure black pigment composition sold by the Drakenfeld Co., a division of Hercules Incorporated, Washington, Pa., under the designation of Drakenfeld 1795 Black which is a composition comprised of approximately 30 percent by weight of chrome oxide, 32 percent by weight of cobalt oxide, and 38 percent by weight of iron oxide. This composition is employed in an oily mixture of pine oil and resin sold under the tradename of Drakenfeld 900 to form a mixture designated "Drakenfeld 1795 Black Oxide in 900 Oil".

As a specific example of altering the residual stain remaining along the V-shaped bend in a finished glass sheet as a result of the firing of the conductive metallic paste initially applied thereto for localized heating in accordance with the method of this invention, a glass sheet of nominal 0.235 inch thickness was procured.

A uniform coating of a fritless pure black pigment, such as that referred to above as Drakenfeld 1795 Black Oxide in 900 oil was applied by a silk screen printing process in a band or strip having a width of one-half inch to one surface of the glass sheet along the line about which the glass sheet was to be bent, the band extending intermediate the opposite edges of the sheet and parallel thereto. After the band of pigment dried at room temperature, a silver composition comprised of about 85 percent by weight of conductive silver particles, and the remainder composed of solvent, binder and frit, marketed by E. I. duPont de Nemours and Co. under the designation "8966," was then superimposed in a width of 0.120 inch on the band of black pigment lengthwise thereof by a conventional silk screen printing process.

This sheet was supported at the two opposite or transverse edges only on a mold and heated in a furnace set to a temperature of 1,150° F. During this heating, the finely divided metal ceramic frit fused onto the glass surface. The glass and integral frit line were then allowed to cool to room temperature and electrical connections such as those shown in FIGS. 4, 5, and 6 were made to the frit line and the mold supported sheet again placed in the furnace and heated to a temperature of 1,150° F. When this temperature was obtained, electrical energy was supplied to the frit line, and more particularly, a current of 16 amperes was passed therethrough. This current was supplied for approximately 1 minute at which time the sheet had assumed a generally V-shaped appearance, the bend occurring at and along the frit line or electrically conducting element 14. The sheet was then removed from the furnace and cooled quickly to produce a tempered structure.

It should be noted that it is not necessary that the sheet be allowed to cool down after firing of the frit and then reheated for the bending operation. The electrical connections may be made prior to the firing and this step accomplished during heating of the sheet to the bending temperature.

Figure 3:
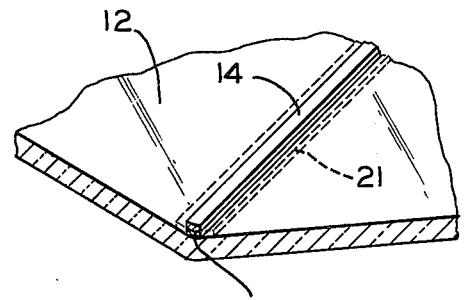
FIG. 3 is a sectional view taken along the line 3—3 of FIG. 2, showing the application of an undercoating beneath the electrically conducting path formed on the inner surface of the backlight.

After the finished glass sheet had cooled sufficiently, only that portion of the black oxide pigment directly beneath the silver paste material, indicated at 21a in FIG. 3, adhered to the glass surface and the remainder, shown in dotted outline, was readily removed as by wiping for example. This yielded a glass sheet product having a long, relatively narrow line along the sharp bend which appeared white on the surface to which the electrical conductive paste material was applied and black on the opposite surface, i.e., the glass side of the sheet. Also, it was found that vigorous rubbing would remove all traces of the silver paste material, even through it initially contained glass frit, resulting in a line which appeared black when viewed from both sides of the finished glass product and is especially desirable in some applications.

Since the coloring agent disposed outwardly of the marginal edges of the frit line is easily removed, the strip 21 of coloring agent can be quickly applied in a relatively wide band without special regard to indexing, i.e., accurate alignment of its marginal edges with those of the subsequently applied resistance element 14. This saves time and becomes especially advantageous in a mass production operation.

Another conductive paste material which was successfully employed in combination with the pure black pigment described above was a fritless, conductive silver paste preparation comprised of approximately 85 percent by weight of silver particles, the remainder consisting of a suitable solvent and binder, marketed by E. I. duPont de Nemours and Co. under the designation "9105." It was found that the utilization of a fritless silver paste material as the electrically conductive path enables the residual silver stain to be completely removed, thus leaving only a black line visible on the opposite surfaces of the finished glass product, which has been found desirable in many design applications.

While the pure black oxide pigment described above is preferable, it should be understood that the black pigments containing frit can be successfully employed as coloring agents in carrying out the method of the present invention. One such coloring agent is available under the tradename "Drakenfeld 24–339" in 175 oil. This is a black pigment — glass frit composition or enamel containing approximately 10 percent by weight of glass frit. The Drakenfeld 24–339 composition and Drakenfeld 1795 pure black pigment composition were blended in the following ratios: 10/90; 25/75; and 50/50. These blended compositions were applied, such as by suitable silk screen printing processes for example, in a one-half inch wide band across the glass sheet. After being dried at room temperature, a silver paste preparation, identified as duPont "8966," was superimposed on the band as a line having a width of 0.120 inch extending lengthwise of the band.

After firing the electrical conductive material to effect the relatively sharp bend as described above, it was found that the 10/90 and 25/75 mixtures fused to the glass only in the area beneath the electrical conductive path as defined by the silver paste material. The excess of the 10/90 mixture, i.e., those portions disposed outwardly beyond the marginal edges of the silver paste line could be readily removed, as by wiping for example, while removal of the excess 25/75 mixture required slightly more effort. In both instances, the silver electrical conductive material adhered to the glass surface which appeared as a black line when viewed from the glass side, i.e., the surface opposite of that to which the electrical conductive material was applied and white when viewed from the opposite side of the glass.

All of the 50/50 mixture fused to the glass, creating a relatively wide band across the surface of the finished glass product. Thus, the lesser the percentage of frit contained in the coloring agent undercoating, the lesser the possibility of adherence to the glass with consequent easier removal of the excess portions of the coloring agent.

From the foregoing, it is apparent that the objects of the invention have been fully accomplished. By interposing an undercoating of coloring agent between the electrically conductive paste material and the surface of the glass sheet, the undesirable color of the residual stain resulting from the firing thereof can be altered in accordance with optically acceptable specifications without adversely affecting the appearance of the windshield or backlight or obstructing visibility therethrough. It should be understood that when it is desired to apply electrically conducting paths to the opposite surfaces of a glass sheet, or into a groove formed therein, the coloring agent also would be applied to such opposite surfaces or into such groove, respectively, as a substrate or undercoating for the electrically conductive material forming said paths.

We claim:

1. A process for treating a glass sheet adapted to be bent to a relatively sharp angle comprising: applying a band of coloring agent to at least one surface of the sheet along the line about which it is desired to bend the sheet; superimposing a layer of electrically conducting material on said band lengthwise thereof to form an electrically conductive path; applying an electrical potential across said path of a sufficient magnitude and for a time adequate to heat the sheet in the area immediately adjacent said path to a temperature above the bending point of the glass causing said sheet to bend along said line and forming a stain therealong of desired appearance.

2. A process for treating a glass sheet according to claim 1, including applying said band of coloring agent in a strip having a relatively wide dimension relative to said electrically conducting path.

3. A process for treating a glass sheet according to claim 2, including removing the excess coloring agent to leave a relatively narrow residual stain line of desired color along said bend.

4. A process for treating a glass sheet according to claim 1, wherein said coloring agent comprises a black pigment applied to said sheet by a silk screen printing process.

5. A process for treating a glass sheet according to claim 1, wherein said coloring agent comprises a black pigment containing frit.

6. A process for treating a glass sheet according to claim 1, wherein said coloring agent comprises a mixture of pure black pigment and a black enamel containing about 10 percent by weight of frit in a ratio of about 9 to 1, respectively.

7. A process for treating a glass sheet according to claim 1, wherein said coloring agent comprises a mixture of pure black pigment and a black enamel containing about 10 percent by weight of frit in a ratio of about 3 to 1, respectively.

8. A process for treating a glass sheet according to claim 1, wherein said coloring agent is applied along an elongated groove previously formed along the line about which it is desired to bend the sheet.

9. A process for treating a glass sheet according to claim 1, wherein said sheet is heated to a temperature in the range of from about 900° to 1,150° F. prior to passing said electrical current through said path.

10. A process for treating a glass sheet according to claim 1, wherein said sheet is heated in the area immediately adjacent said path to a temperature above approximately 1,200° F.

* * * * *